United States Patent
Fang et al.

(10) Patent No.: US 12,467,371 B2
(45) Date of Patent: *Nov. 11, 2025

(54) ADHESIVE BOND FOR FAN BLADES

(71) Applicant: RTX Corporation, Farmington, CT (US)

(72) Inventors: Xiaomei Fang, South Glastonbury, CT (US); John Harner, Florence, MA (US); David J. Mathiau, Jr., East Hartford, CT (US); William R. Graves, Amston, CT (US); James O. Hansen, Hobe Sound, FL (US)

(73) Assignee: RTX CORPORATION, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/893,158

(22) Filed: Sep. 23, 2024

(65) Prior Publication Data

US 2025/0012196 A1    Jan. 9, 2025

Related U.S. Application Data

(63) Continuation of application No. 18/299,478, filed on Apr. 12, 2023, now Pat. No. 12,098,653.

(51) Int. Cl.
| | |
|---|---|
| *F01D 5/28* | (2006.01) |
| *C09J 163/00* | (2006.01) |
| *C09J 175/04* | (2006.01) |

(52) U.S. Cl.
CPC ........... *F01D 5/288* (2013.01); *C09J 163/00* (2013.01); *C09J 175/04* (2013.01); *F05B 2230/23* (2013.01); *F05B 2230/90* (2013.01); *F05B 2280/6011* (2013.01)

(58) Field of Classification Search
CPC ........ F01D 5/147; F01D 5/282; F04D 29/324; F05D 2220/36
See application file for complete search history.

(56) References Cited

U.S. PATENT DOCUMENTS

| | | | |
|---|---|---|---|
| 9,221,120 B2* | 12/2015 | Schwarz | ................ F01D 5/147 |
| 10,107,302 B2 | 10/2018 | Berschback et al. | |
| 10,982,683 B2 | 4/2021 | Drozdenko et al. | |
| 11,015,460 B2 | 5/2021 | Gimat et al. | |
| 11,248,467 B2 | 2/2022 | Merriman | |
| 11,346,362 B2 | 5/2022 | Bales et al. | |

(Continued)

FOREIGN PATENT DOCUMENTS

EP    4159361 A1    4/2023

OTHER PUBLICATIONS

Search Report issued in European Patent Application No. 24170074.9; Application Filing Date Apr. 12, 2024; Date of Mailing Oct. 16, 2024 (8 pages).

*Primary Examiner* — Eldon T Brockman
(74) *Attorney, Agent, or Firm* — CANTOR COLBURN LLP

(57) ABSTRACT

Disclosed herein is a blade for a turbine comprising a blade cover; a blade body; and a layer of adhesive disposed between the blade cover and the blade body; where the layer of adhesive comprises a first adhesive region and a second adhesive region; where the first adhesive region comprises an adhesive that is chemically different from an adhesive used in the second adhesive region.

19 Claims, 5 Drawing Sheets

(56) References Cited

U.S. PATENT DOCUMENTS

| | | | | |
|---|---|---|---|---|
| 11,639,685 | B1* | 5/2023 | Zheng | F01D 5/16 |
| | | | | 415/119 |
| 2013/0220536 | A1* | 8/2013 | Parkin | F01D 5/16 |
| | | | | 156/291 |
| 2015/0151485 | A1* | 6/2015 | Godon | B29C 66/8221 |
| | | | | 264/261 |
| 2015/0377031 | A1 | 12/2015 | Cosby et al. | |
| 2016/0177732 | A1 | 6/2016 | Whitehurst et al. | |
| 2017/0023010 | A1* | 1/2017 | Drozdenko | F01D 5/286 |
| 2017/0343007 | A1 | 11/2017 | Murdock | |
| 2020/0240272 | A1* | 7/2020 | Merriman | F04D 29/164 |
| 2023/0175401 | A1 | 6/2023 | Zheng et al. | |
| 2024/0344461 | A1 | 10/2024 | Fang et al. | |

* cited by examiner

ADHESIVE BOND FOR FAN BLADES

CROSS-REFERENCE TO RELATED APPLICATIONS

This application is a Continuation of U.S. application Ser. No. 18/299,478 filed Apr. 12, 2023, the disclosure of which is incorporated herein by reference in its entirety.

BACKGROUND

This disclosure relates to adhesive bonds for fan blades. Aluminum fan blades such as, for example, those used in geared turbofan (GTF) engines comprise an aluminum blade body and an aluminum cover. An elastomer-based adhesive provides excellent flexibility and impact resistance when used to bond the aluminum cover to the aluminum blade body. An epoxy-based adhesive, on the other hand, displays enhanced bond performance at elevated temperatures and superior environmental durability. However, epoxy-based adhesives are less flexible than the elastomer-based adhesives.

FIG. 1 depicts a hollow blade 30 comprising an airfoil 32, sheath 34, and root 36. Blade 30 includes leading edge 38, trailing edge 40, suction surface 42, pressure surface (opposite to the suction surface 42 and which is not visible in FIG. 1), platform 46, tip edge 48, cavity cover 50 (also referred to herein as the blade cover 50), and socket 52 (also referred to herein as the blade body 52). Airfoil 32 is a hollow aerodynamic structure. Root 36 links blade 30 at platform 46 to a disk or rotor (not shown). Cavity cover 50 engages with socket 52, covering an opening and completing a continuous first surface of blade 30. The blade cover 50 is adhesively bonded to the blade body 52 via an adhesive bond that lies between the blade cover and the blade body. This adhesive bond is referred to herein as the blade cover bond.

Stress concentration varies with location on the blade cover bond due to the different loading levels that different portions of the fan blade experience in service. Some locations require higher shear and peel bond strength than others. High cover bond strength, greater bond-line damage growth resistance and enhanced long-term bond durability are therefore desirable for fan blade quality and engine safety. One single adhesive, either elastomer or epoxy alone, would be difficult to achieve all desirable cover bond performance including high bond strength, superior environmental durability and excellent impact resistance.

BRIEF DESCRIPTION

A blade for a turbine comprises a blade cover and a blade body. A layer of adhesive is disposed between the blade cover and the blade body; where the layer of adhesive comprises a first adhesive region and a second adhesive region. The first adhesive region lies proximate to a blade tip and the second adhesive region lies proximate to a blade root, where the first adhesive region comprises an adhesive that is chemically different from an adhesive used in the second adhesive region.

In an embodiment, the first adhesive region comprises a polyurethane elastomer.

In another embodiment, the second adhesive region comprises a polyepoxide adhesive.

In yet another embodiment, the second adhesive region is less susceptible to ambient moisture than the first adhesive region.

In yet another embodiment, the second adhesive region is smaller in area than the first adhesive region.

In yet another embodiment, the second adhesive region has a bonding area of 30 to 70% of the bond region.

In yet another embodiment, the first adhesive region has a bonding area of 30 to 70% of the bond region.

In yet another embodiment, the first adhesive region contacts the second adhesive region along a bond-line.

In yet another embodiment, the first adhesive region does not contact the second adhesive region along an areal surface.

In yet another embodiment, the first adhesive region partially or completely surrounds the second adhesive region.

In yet another embodiment, the second adhesive region partially or completely surrounds the first adhesive region.

In yet another embodiment, the first adhesive region lies proximate to a blade tip and the second adhesive region lies proximate to a blade root.

In yet another embodiment, the second adhesive region lies proximate to a blade tip and the first adhesive region lies proximate to a blade root.

A method for bonding a blade cover to a fan blade body comprises applying a layer of adhesive precursor to an inner surface of a cover; where the layer of adhesive precursor comprises a first adhesive precursor region and a second adhesive precursor region. The first adhesive precursor region lies proximate to a blade tip and the second adhesive precursor region lies proximate to a blade root. The inner surface of the blade cover is brought into contact with the fan blade body. The layer of adhesive precursor is cured to form an adhesive layer that secures the cover to the fan blade body; where the first adhesive region comprises an adhesive that is chemically different from an adhesive used in the second adhesive region.

In an embodiment, the first adhesive region comprises a polyurethane elastomer.

In another embodiment, the second adhesive region comprises a polyepoxide adhesive.

In yet another embodiment, the second adhesive region is less susceptible to ambient moisture than the first adhesive region.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Disclosed herein is an adhesive bond that comprises two or more adhesive compositions adjacently disposed along a surface of the blade body to secure the blade cover to the blade body. The adhesive bond comprises a first adhesive and a second adhesive, where the second adhesive is proximate to the first adhesive. The first adhesive has a different chemical composition from the second adhesive. Each adhesive—the first adhesive and the second adhesive both separately and simultaneously contact the blade body and the blade cover. The first adhesive and the second adhesive may or may not contact each other. Both the blade body and the blade cover are manufactured from aluminum or aluminum alloys thereof and will therefore occasionally be referred to herein as an aluminum fan blade and an aluminum blade cover respectively.

The second adhesive is more environmentally resistant and less susceptible to ambient moisture and elevated temperatures than the first adhesive and, in one example, is located closer to the aluminum fan blade platform than the first adhesive. The first adhesive is more flexible and has higher impact resistance than the second adhesive. The first adhesive is located closer to blade tip and farther away from the aluminum fan blade platform than the second adhesive. When moisture ingresses through the blade cover edge towards the blade platform, the aluminum cover has a reduced tendency to disbond from the aluminum blade body. Disbonding refers to an unplanned non-adhered or unbonded area within a bonded interface. In another example, the first adhesive is applied closer to the aluminum fan blade platform than the second adhesive. When moisture ingresses through cover edge towards the blade tip, the disbond tendency of aluminum cover is significantly reduced.

Fan blades that use adhesive bonds that comprise two or more adhesive compositions that are adjacently disposed display enhanced environmental durability over fan blades that do not contain multiple adhesives (e.g., an adhesive bond that contains only an elastomeric adhesive) while maintaining impact resistance.

Figure 1:
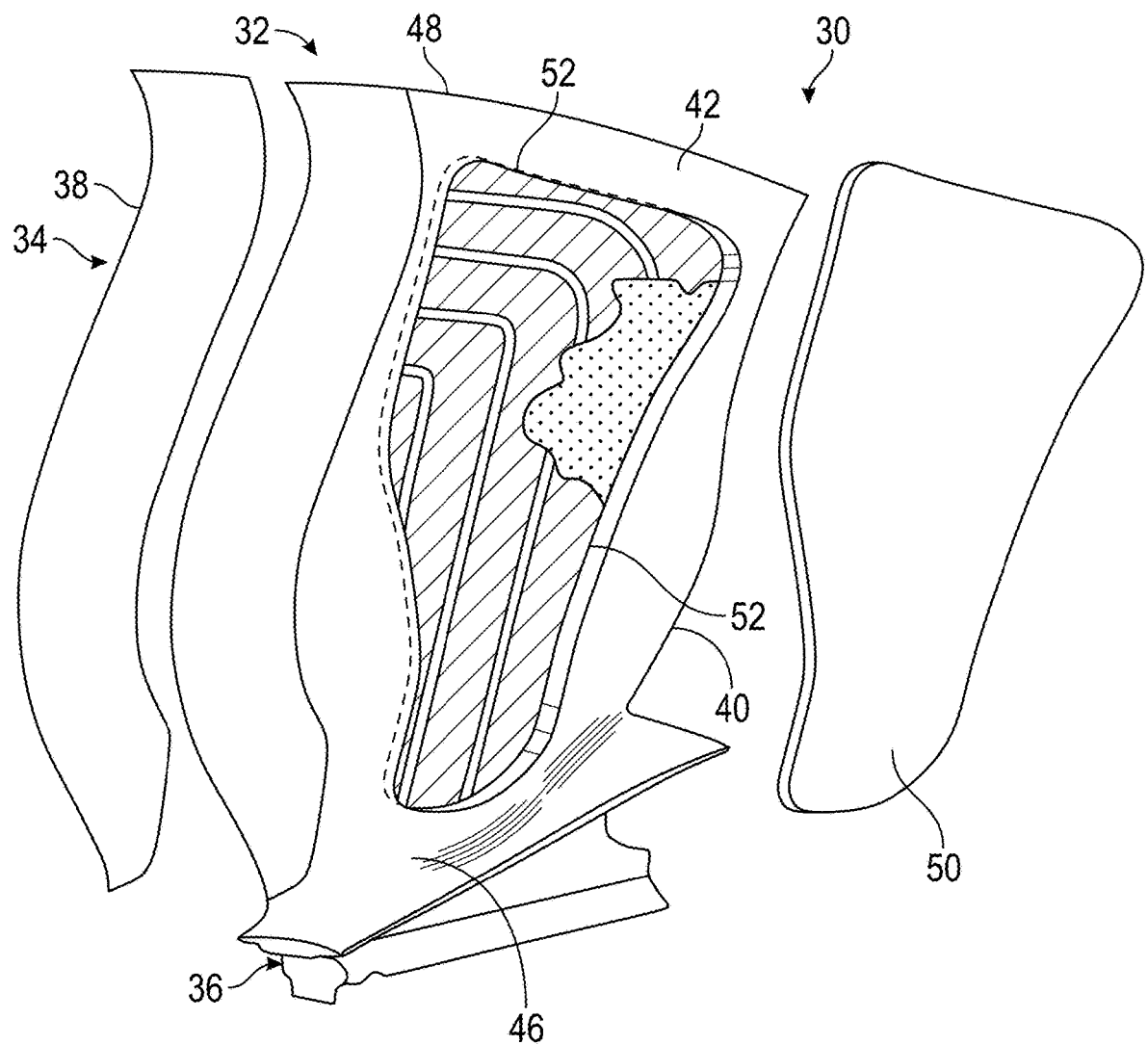
FIG. 1 depicts stress analysis that occurs in the adhesive bond located between the blade cover and the blade body.
Figure 2:
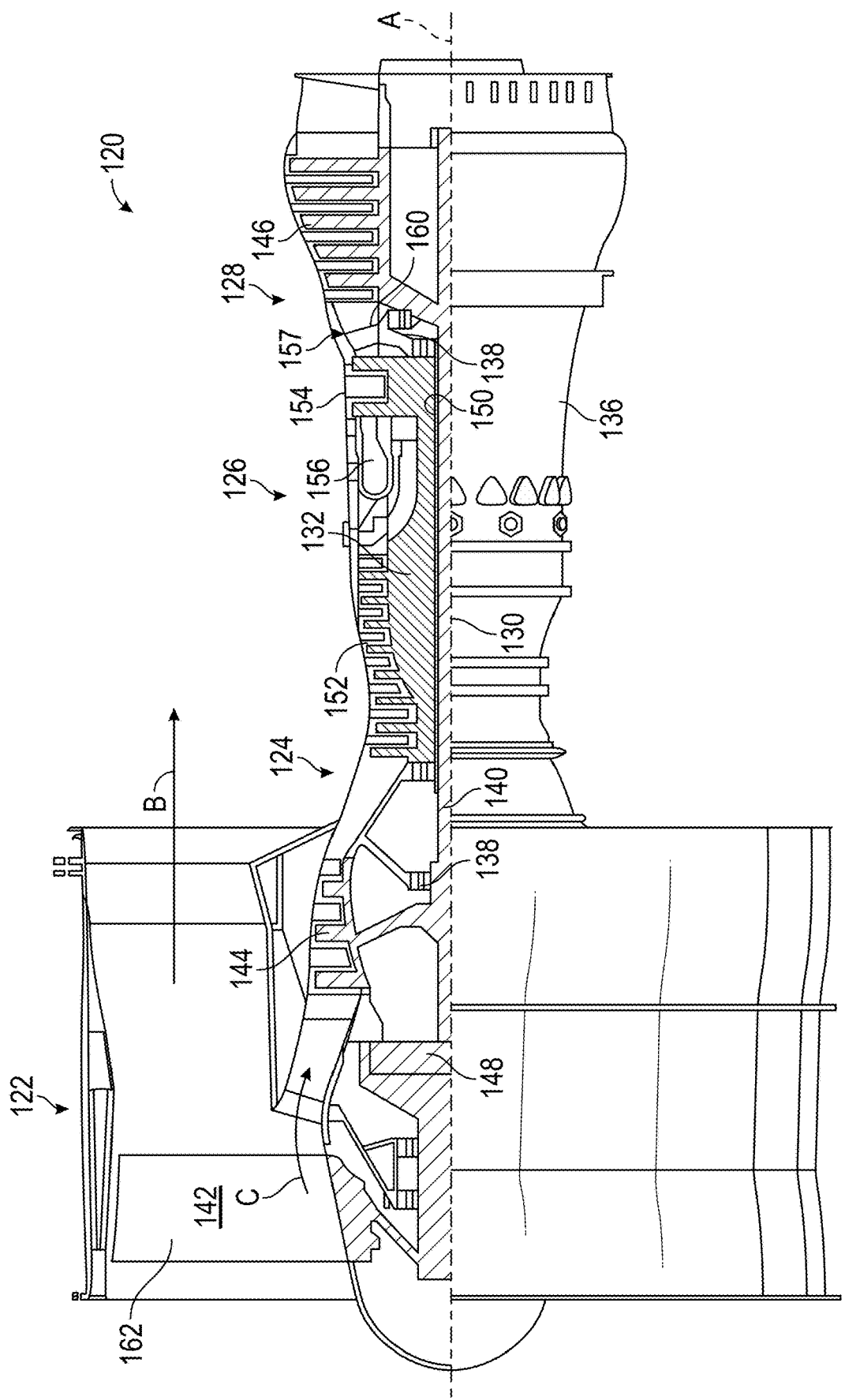
FIG. 2 schematically illustrates a gas turbine engine.

FIG. 2 schematically illustrates a gas turbine engine 120. The gas turbine engine 120 is disclosed herein as a two-spool turbofan that generally incorporates a fan section 122, a compressor section 124, a combustor section 126 and a turbine section 128. Alternative engines might include an augmentor section (not shown) among other systems or features. Although depicted as a turbofan gas turbine engine in the disclosed non-limiting embodiment, it should be understood that the concepts described herein are not limited to use with turbofans as the teachings may be applied to other types of turbine engines including three-spool or geared turbofan architectures. The fan section 122 drives air along a bypass flowpath B while the compressor section 124 drives air along a core flowpath C for compression and communication into the combustor section 126 then expansion through the turbine section 128.

The engine 120 generally includes a low speed spool 130 and a high speed spool 132 mounted for rotation about an engine central longitudinal axis A relative to an engine static structure 136 via several bearing systems 138. It should be understood that various bearing systems 138 at various locations may alternatively or additionally be provided.

The low speed spool 130 generally includes an inner shaft 140 that interconnects a fan 142, a low pressure compressor 144 and a low pressure turbine 146. The inner shaft 140 is connected to the fan 142 through a geared architecture 148 to drive the fan 142 at a lower speed than the low speed spool 130. The high speed spool 132 includes an outer shaft 150 that interconnects a high pressure compressor 152 and a high pressure turbine 154.

A combustor 156 is between the high pressure compressor 152 and the high pressure turbine 154. A mid-turbine frame 158 of the engine static structure 136 is arranged generally between the high pressure turbine 154 and the low pressure turbine 146. The mid-turbine frame 158 further supports bearing systems 138 in the turbine section 128.

The inner shaft 140 and the outer shaft 150 are concentric and rotate via bearing systems 138 about the engine central longitudinal axis A, which is collinear with their longitudinal axes.

The core airflow C is compressed by the low pressure compressor 144, then the high pressure compressor 152, mixed and burned with fuel in the combustor 156, then expanded over the high pressure turbine 154 and low pressure turbine 146. The mid-turbine frame 158 includes airfoils 160 which are in the core airflow path C. The turbines 146, 154 rotationally drive the respective low speed spool 30 and high speed spool 132 in response to the expansion.

A significant amount of thrust is provided by the bypass flow B due to the high bypass ratio. The fan section 122 of the engine 120 is designed for a particular flight condition—typically cruise at about 0.8 Mach and about 35,000 feet (10,668 meters). The flight condition of 0.8 Mach and 35,000 feet (10,668 meters), with the engine at its best fuel consumption, also known as "bucket cruise Thrust Specific Fuel Consumption ('TSFC')," is the industry standard parameter of $lb_m$ (pound-mass) of fuel being burned divided by $lb_f$ (pound-force) of thrust the engine produces at that minimum point.

Figure 3:
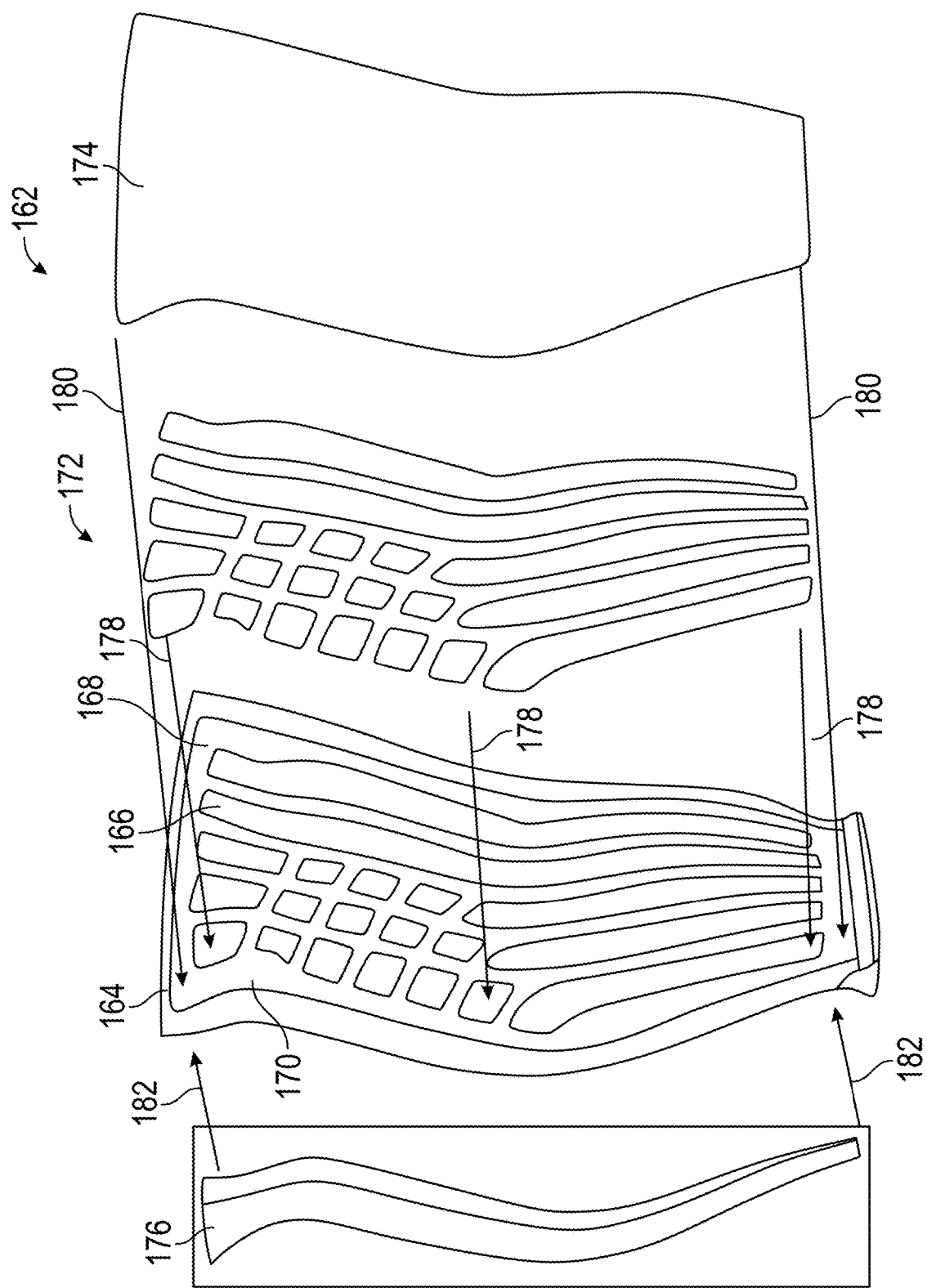
FIG. 3 illustrates an inner surface of a cover of a fan blade with an adhesive applied near an edge.

Aluminum fan blades such as, for example, those used in geared turbofan (GTF) engines comprise an aluminum blade body and an aluminum cover. The fan 142 includes a plurality of hybrid metallic fan blades 162. As shown in FIG. 3, each fan blade 162 includes a blade body 164 having an inner surface 170 including a plurality of cavities 166, such as grooves or openings, surrounded by ribs 168. A plurality of strips or pieces of a low density filler 172 are each sized to fit in one of the plurality of cavities 166. The fan blade 162 also includes a cover 174 and a leading edge sheath 176 attached to the blade body 164.

In one example, the blade body 164 is made of aluminum or an aluminum alloy. Employing aluminum or an aluminum alloy for the blade body 164 and the cover 174 provides a cost and weight savings. There is one strip or piece of the low density filler 172 for each of the plurality of cavities 166 of the blade body 164. In one example, the low density filler 172 is a foam. In one example, the foam is aluminum foam. The low density filler 172 is secured in the cavities 166 with an adhesive 178, shown schematically as arrows. In one example, the adhesive 178 is urethane. In another example, the adhesive 178 is an epoxy film.

The cover 174 is then secured to the blade body 164 with two types of adhesives—a first adhesive 180A and a second adhesive 180B, as depicted in the FIGS. 4A, 4B, 4C, 4D, 4E and 4F. The first adhesive 180A and the second adhesive 180B have the same thickness but may have different areas. These are detailed below.

Figure 4C:
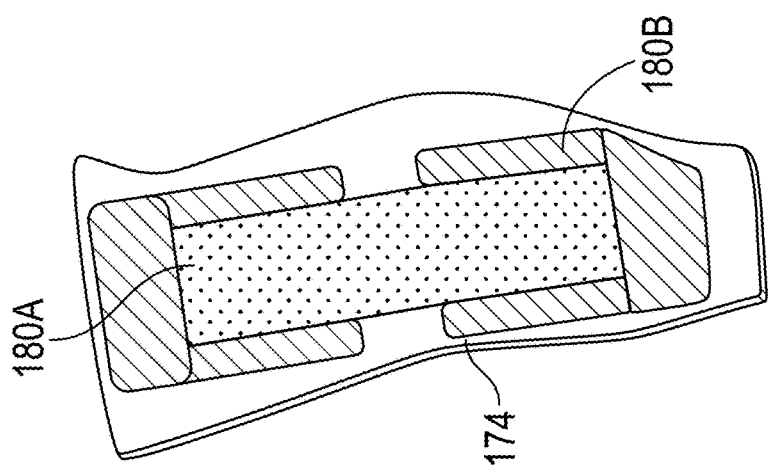
FIGS. 4A, 4B, 4C, 4D, 4E and 4F depict the first adhesive and the second adhesive in different embodiments as they may be applied to the inner surface of the blade cover.
Figure 4B:
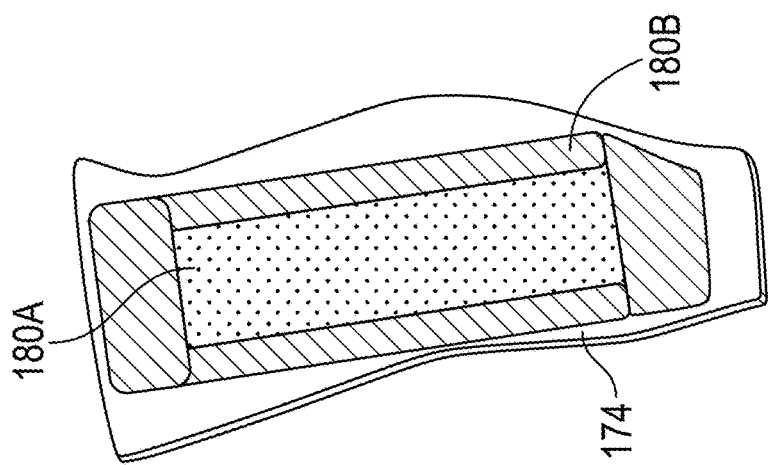
Figure 4A:
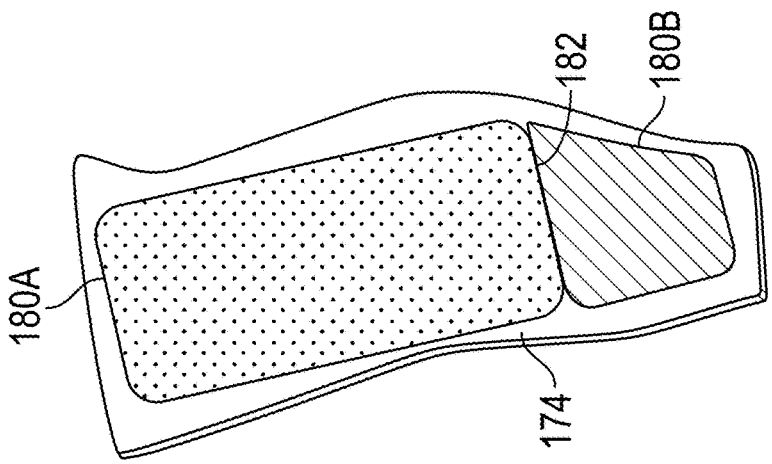

FIG. 4A depicts one exemplary embodiment where the first adhesive 180A comprises a polyurethane elastomer while the second adhesive 180B comprises an epoxy. FIGS. 4A, 4B, 4C, 4D, 4E and 4F depict the first adhesive 180A and the second adhesive 180B in different embodiments as they can be applied to the inner surface of the blade cover 174. It is understood that the first adhesive 180A is located on the inner surface of the blade cover in the first adhesive region and the second adhesive 180B is located on the inner surface of the blade cover in the second adhesive region. In an embodiment, in the FIG. 4A, the first adhesive 180A is applied between the blade body 164 and the blade cover 174 in a first adhesive region proximate to the tip of the blade. The second adhesive 180B is applied between the blade body 164 and the blade cover 174 in a second adhesive region proximate to the blade platform or root. In this embodiment, the first adhesive region is significantly larger than the first adhesive region.

In an embodiment, the first adhesive 180A and a second adhesive 180B (both of which lie between the blade body 164 and the blade cover 174) contact each other at an interface. In other words, there is a bond-line 182 between the first adhesive region and the second adhesive region where the first adhesive 180A contacts the second adhesive 180B (butt joint).

FIG. 4B depicts another exemplary embodiment where the first adhesive 180A is surrounded by the second adhesive 180B. In other words, the first adhesive region can surround the second adhesive region. The first adhesive region may be smaller or larger than the second adhesive region in area, but it is surrounded by the second adhesive region.

FIG. 4C depicts another exemplary embodiment, where the first adhesive 180A partially surrounded the second adhesive 180B. In the embodiments depicted in the FIGS. 4B and 4C, the second adhesive 180B forms a protective ring around substantially all of the first adhesive 180A. In the FIGS. 4B and 4C, the second adhesive 180B contacts the first adhesive 180A along the periphery of the first adhesive. The first adhesive region lies within the second adhesive region. The first adhesive and the second adhesive only contact each other along a line and do not contact each other along a plane (e.g., there is no areal contact). In other words, the first adhesive and the second adhesive are not disposed atop one another. In the FIGS. 4B and 4C, the thickness of the first adhesive is similar to the thickness of the second adhesive.

Figure 4F:
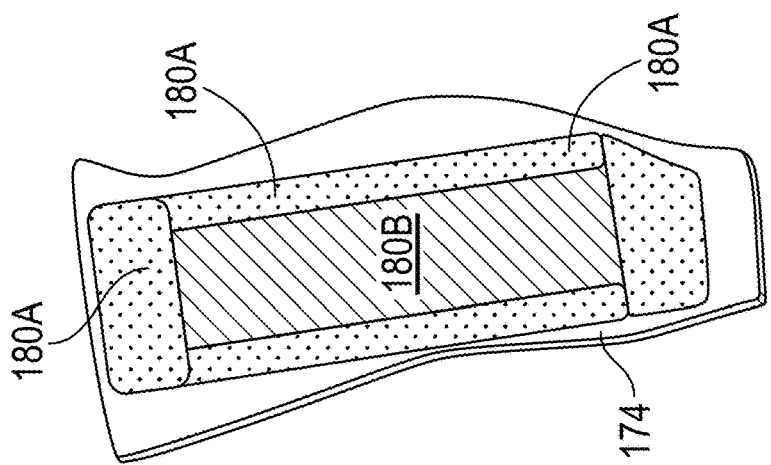
Figure 4E:
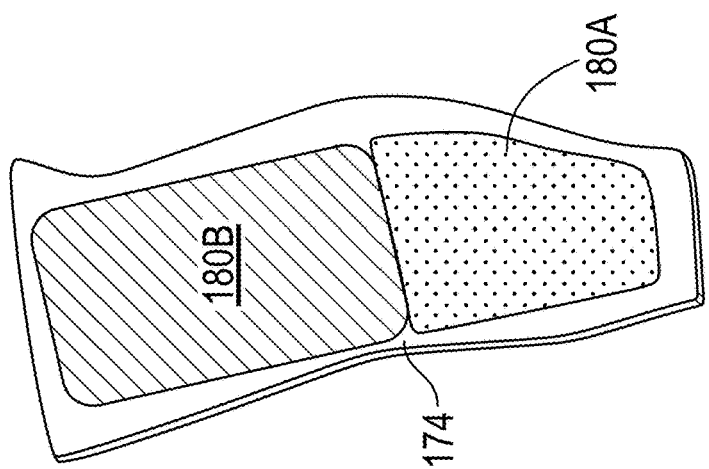
Figure 4D:
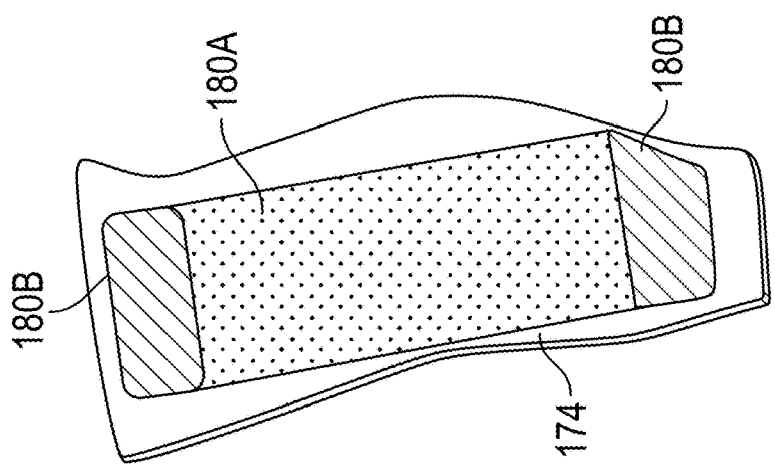

In the embodiment depicted in FIG. 4D, the second adhesive 180B is applied on both cover edges towards the blade tip and blade platform while the rest of the blade cover is coated with the first adhesive 180A. In summary from the FIG. 4B. from the FIGS. 4B, 4C and 4D, the second adhesive 180B may either completely or partially surround the first adhesive 180A. In other words, the second adhesive region (the region on the inner surface of the blade cover where the second adhesive 180B is applied) may either completely or partially surround the first adhesive region (the region on the inner surface of the blade cover where the first adhesive 180A is applied).

FIGS. 4E and 4F display the dual-adhesive cover bond embodiments similar to FIGS. 4A and 4B, but the first adhesive region and the second adhesive regions are switched to accommodate different blade stress loading scenarios, where the first adhesive 180A provides impact resistance and extensive deformation and the second adhesive 180B adds improved environmental resistance to cover bond.

In the FIG. 4E, the first adhesive 180A is located proximate to the blade platform or root relative to the location of the second adhesive 180B, which is located proximate to the blade tip. In the FIG. 4F, the first adhesive 180A surrounds the second adhesive 180B. The first adhesive region can therefore partially or completely surround the second adhesive region or vice versa (i.e., the second adhesive region can partially or completely surround the first region).

In an embodiment, the first adhesive region is more impact resistant and can accommodate more bond-line deformation than the second adhesive region. The bond-line represents the periphery of one adhesive region relative to another.

In an embodiment, the first adhesive region and the second adhesive region cover the entire surface between the blade body and the blade cover. In an embodiment, the first adhesive 180A (which comprises the polyurethane) covers 30 to 70% of the bonding area between the blade body and the blade cover, while the second adhesive covers 70 to 30% of the bonding area between the blade body and the blade cover. In another embodiment, the bonding area of the first bonding region (that contains the polyurethane) is greater than bonding area of the second bonding region (that contains the epoxy). There is no intermixing between the first adhesive and the second adhesive.

Polyurethane (used in the first adhesive 180A) is an elastomeric adhesive that is typically produced by reacting an isocyanate with a polyol. Both the isocyanates and polyols used to make a polyurethane may contain two or more functional groups per molecule. Elastomers typically have an elastic modulus of 80 to 120 Megapascals.

Polyepoxides (used in the second adhesive 180B) are generally obtained by polymerizing epoxide monomers have more than one epoxide group. The epoxide monomers can undergo ring-opening polymerization. In an embodiment, the monomers may include aromatic epoxides formed by the epoxidation of phenols. The epoxide monomers can include functional groups, including, but not limited to the ethers, enol ethers, esters, and alcohols. In an embodiment, the epoxide monomers can be halogenated.

In an embodiment, a method for bonding a blade cover to a fan blade body comprises applying a layer of adhesive precursor to an inner surface of a cover. The layer of adhesive precursor comprises a first adhesive precursor layer applied to the first adhesive region and a second adhesive precursor layer applied to the second adhesive region. The first adhesive precursor region and the second adhesive precursor region are arranged according to the patterns shown in the FIGS. 4A-4F. The inner surface of the blade cover is permitted to contact the fan blade body. Pressure may be applied to the blade cover and the fan blade body to facilitate adhesion to each other via the adhesive layer. The temperature may be increased to facilitate curing of the respective adhesive precursors to form the respective adhesive regions. The layer of adhesive precursor is cured to form an adhesive layer that secures the cover to the fan blade body.

In one manner of producing the bond (between the blade body and the blade cover) comprising the first adhesive 180A and the second adhesive 180B, the respective uncured adhesive precursors are applied to the blade cover and the blade body in the desired regions. The blade cover is then made to contact the blade body. The blade body with the blade cover disposed thereon is then subjected to elevated pressure and temperature in an autoclave. In an embodiment, the pressure in the autoclave is 1 to 5, preferably 2 to 3 kilograms per square centimeter, while the temperature is 100 to 130° C., preferably 105 to 120° C. The adhesive precursors may undergo curing in the autoclave to form the cured adhesive between blade body and the blade cover.

After removal from the autoclave, any adhesive that protrudes outside the blade cover may be removed. Finishing operations may be conducted on the blade as desired. The blade may then be installed in a gas turbine engine as shown in the FIG. 2 above.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A blade for a turbine comprising:
   a blade cover;
   a blade body;
   a layer of adhesive disposed between the blade cover and the blade body; where the layer of adhesive comprises a first adhesive region and a second adhesive region; where the first adhesive region comprises an adhesive that is chemically different from an adhesive used in the second adhesive region; wherein the first adhesive region contacts the second adhesive region along a bond-line, but where the first adhesive region does not contact the second adhesive region along an areal surface.

2. The blade of claim 1, where the region along the bond-line extends in a thickness direction of the adhesive.

3. The blade of claim 1, where the first adhesive region comprises a polyurethane elastomer.

4. The blade of claim 1, where the second adhesive region comprises a polyepoxide adhesive.

5. The blade of claim 1, where the second adhesive region is less susceptible to ambient moisture than the first adhesive region.

6. The blade of claim 1, where the first adhesive region is more impact resistant and can accommodate more bond-line deformation than the second adhesive region.

7. The blade of claim 1, where the second adhesive region covers 30 to 70% of a bonding area between the blade body and the blade cover.

8. The blade of claim 1, where the first adhesive region covers 30 to 70% of a bonding area between the blade body and the blade cover.

9. The blade of claim 1, where the first adhesive region partially surrounds the second adhesive region.

10. The blade of claim 1, where the first adhesive region completely surrounds the second adhesive region.

11. The blade of claim 1, where the second adhesive region partially surrounds the first adhesive region.

12. The blade of claim 1, where the second adhesive region completely surrounds the first adhesive region.

13. The blade of claim 1, where the first adhesive region lies proximate to a blade tip and the second adhesive region lies proximate to a blade root.

14. The blade of claim 1, where the second adhesive region lies proximate to a blade tip and the first adhesive region lies proximate to a blade root.

15. A blade for a turbine comprising:
    a blade cover;
    a blade body;
    a layer of adhesive disposed between the blade cover and the blade body; where the layer of adhesive comprises a first adhesive region and a second adhesive region; where the first adhesive region comprises an adhesive that is chemically different from an adhesive used in the second adhesive region; wherein the first adhesive and the second adhesive contact each other along a bond-line that is a butt joint.

16. The blade of claim 15, where the first adhesive region comprises a polyurethane elastomer.

17. The blade of claim 15, where the second adhesive region comprises a polyepoxide adhesive.

18. The blade of claim 15, where the second adhesive region is less susceptible to ambient moisture than the first adhesive region.

19. The blade of claim 15, where the first adhesive region does not contact the second adhesive region along an areal surface.

* * * * *